United States Patent Office 2,727,057
Patented Dec. 13, 1955

2,727,057

PREPARATION OF ETHYLENE SULFONATES

Harold F. Park, East Longmeadow, Mass., assignor to Monsanto Chemical Company, St. Louis, Mo., a corporation of Delaware No Drawing. Application March 1, 1952,
Serial No. 274,513

5 Claims. (Cl. 260—456)

This invention relates to ethylene sulfonic acid products. More particularly the invention relates to a process for the preparation of salts and esters of ethylene sulfonic acid.

Ethylene sulfonic acid and its salts and esters are generally prepared from ethane disulfonyl chloride by hydrolysis and distillation. The ethane disulfonyl chloride is somewhat difficult to make and to separate from the by-products formed during its preparation.

The object of this invention is to provide a new process for the preparation of ethylene sulfonic acid salts and esters.

The object of the invention is attained by reacting acetylene with an acid salt or ester of sulfurous acid.

The following examples are given in illustration and are not intended as limitations on the scope of this invention. Where parts are mentioned they are parts by weight.

Example I

Prepare a saturated aqueous solution of sodium bisulfite at about 100° C. Bubble purified acetylene gas slowly into the solution while maintaining the solution at 100° C. At the same time, add continuously a 0.1% aqueous solution of potassium persulfate to the bisulfite solution, at such a rate that the reaction medium contains about 0.01 part of potassium persulfate for each 100 parts of acetylene. When no further acetylene is absorbed by the reaction medium, add 0.1 part of hydroquinone for each 100 parts of bisulfite used. Cool the reaction medium. Remove the water under a vacuum and extract the residue with anhydrous ethanol. Remove the alcohol by evaporation at room temperature. The product is a mass of white crystals of the sodium salt of ethylene monosulfonic acid.

Example II

Introduce a stream of concentrated aqueous ammonium bisulfite solution containing a small amount of ammonium nitrite into the top of a vertical column packed with glass beads. At the same time, introduce a stream of pure acetylene into the bottom of the column so that it bubbles up through the descending ammonium bisulfite solution. Maintain the column at a temperature of about 25° C. Continuously withdraw the aqueous solution from the bottom of the column. On purification by distillation of the water under vacuum followed by extraction of the residue with ethanol, a mixture of the ammonium salt of ethylene sulfonic acid and the diammonium salt of ethylene disulfonic acid together with unreacted ammonium bisulfite is obtained. The ammonium ethylene sulfonate may be recovered by fractional crystallization.

Example III

Prepare a saturated solution of ethyl hydrogen sulfite in water at about 100° C. Bubble two mols of acetylene slowly through the solution and at the same time add a 0.1% aqueous solution of potassium persulfate to the solution at such a rate that the weight ratio of persulfate to acetylene is always about 0.01:1. Maintain the reaction at 100° C. throughout the reaction. When no more acetylene is absorbed, cool the reaction medium and remove the water by vacuum distillation. Extract the residue with anhydrous ethanol and recover the reaction products by fractional crystallization from the alcohol solution. A 75% yield of the ethyl ester of ethylene sulfonic acid is obtained.

Example IV

Prepare a saturated aqueous solution of ammonium bisulfite at about 100° C. Place the solution in an autoclave and heat it to about 200° C. with the autoclave closed. Add slowly to the heated solution a 0.1% aqueous solution of potassium persulfate and at the same time a slow stream of purified acetylene. When 0.5 mol of acetylene has been added, stop the further addition of both catalyst and acetylene and maintain the reaction medium at about 200° C. for about 15 minutes longer. Cool and open the autoclave. The product is an aqueous solution of diammonium ethylene disulfonate with traces of bisulfite and catalyst residue. The sulfonate may be purified by extraction with ethanol followed by crystallization of the sulfonate from the alcohol solution.

The details of the illustrated processes may be varied but, in order to obtain a maximum yield of the ethylene sulfonic acid salt, the amount of acetylene used should be at least 1 mol per mol of bisulfite and preferably should be in the neighborhood of 1.5 to 2 mols per mol of bisulfite. The excess acetylene can be recovered and used over again. If it is desired to obtain the ethylene disulfonic acid salt, the amount of acetylene is restricted to from 0.5 to 1 mol per mol of bisulfite.

The temperature of the reaction may vary between −10° C. and 200° C. with the rate of reaction and the amount of disulfonate increasing as the temperature rises. By using an excess of acetylene and a temperature of about 100° C., ethylene sulfonates are formed quickly in about 80% yields. At the higher temperatures it is necessary to carry out the reaction at elevated pressures. The pressures used may range from a few pounds at 100° C. to 75 atmospheres at 200° C.

Under the conditions of this process, acetylene will react with water-soluble acid salts or esters of sulfurous acid to give the corresponding ethylene sulfonates. Among such water-soluble salts or esters are ammonium bisulfite, alkali metal bisulfites such as lithium, sodium, potassium, rubidium and cesium bisulfites, alkaline earth metal bisulfites such as magnesium, calcium, barium and strontium bisulfites and alkyl acid esters of sulfurous acid in which the alkyl group has from 1 to 8 carbon atoms, including methyl, ethyl, butyl, hexyl and octyl hydrogen sulfites. The reaction is carried out in an aqueous medium and generally a saturated solution of the bisulfite in water is the most suitable.

The reaction proceeds more smoothly and more quickly in the presence of a catalyst which is soluble in water, such as water-soluble peroxy compounds including water-soluble peroxides and peracids and other water-soluble free radical generating compounds such as the ammonium nitrite of Example II. The amount of catalyst used may be varied over a wide range. As little as 0.001 part per 100 parts of bisulfite is effective at the higher reaction temperatures. Below room temperature, it is advisable to use as much as five parts of catalyst per 100 parts of bisulfite in order to complete the reaction within a reasonable time. It is essential that all of the catalyst and all of the bisulfite are not charged to the reaction at the same time. The catalyst may be added slowly to the bisulfite solution or a stream of bisulfite may be added to the catalyst concurrently with the addition of acetylene.

The reaction may also be carried out by adding acetylene and sulfur dioxide concurrently to an aqueous alkaline solution containing all of the catalyst. Under these conditions, a bisulfite is formed in situ substantially as soon as the sulfur dioxide is introduced into the aqueous alkaline medium.

When the reaction is completed, it is advisable to add a small amount of a polymerization inhibitor to the reaction medium before attempting to purify the reaction products. Various polymerization inhibitors such as phenols including hydroquinone, t-butyl catechol, etc., aliphatic amines, aromatic amines, amine oxides, etc. may be used.

The reaction products are ethylene monosulfonic acid salts or esters and ethylene disulfonic acid salts or esters. The compounds may be separated from the reaction medium by evaporation of the water at room temperature and atmospheric pressure and preferably at higher temperatures under a vacuum. By dissolving the residue in anhydrous ethanol, any residual bisulfite may be removed by filtration and the two reaction products may then be separated by fractional crystallization. The ethylene disulfonate may be further reacted with acetylene to obtain a higher yield of the ethylene monosulfonate and conversely the ethylene monosulfonate may be reacted with more bisulfite to give the disulfonate.

Many of the salts and esters of ethylene sulfonic acid may be polymerized alone or with other unsaturated compounds to give resinous materials that are useful as molding powders, coating compositions, adhesives etc.

The process of this invention provides a simple and economical method for preparing the salts and esters of ethylene sulfonic acid.

It is obvious that variations may be made in the process of this invention without departing from the spirit and scope thereof as defined in the appended claims.

What is claimed is:

1. A process for preparing esters and salts of ethylene sulfonic acid which comprises reacting acetylene with a compound taken from the group consisting of alkali metal and ammonium salts of sulfurous acid and alkyl acid esters of sulfurous acid in which the alkyl group contains from 1 to 8 carbon atoms in an aqueous medium at from −10 to 200° C. in the presence of a water-soluble free radical-generating catalyst, said catalyst being added to the reaction mixture slowly throughout the course of the reaction.

2. A process for preparing esters and salts of ethylene sulfonic acid which comprises reacting acetylene with a compound taken from the group consisting of alkali metal and ammonium salts of sulfurous acid and alkyl acid esters of sulfurous acid in which the alkyl group contains from 1 to 8 carbon atoms in the presence of potassium persulfate in an aqueous medium at from −10 to 200° C., said potassium persulfate being added to the reaction mixture slowly throughout the course of the reaction.

3. A process as in claim 1 wherein the salt is ammonium bisulfite.

4. A process as in claim 1 wherein the salt is sodium bisulfite.

5. A process as in claim 1 wherein the ester is ethyl hydrogen sulfite.

References Cited in the file of this patent

UNITED STATES PATENTS

| | | |
|---|---|---|
| 2,398,426 | Hanford | Apr. 16, 1946 |
| 2,552,421 | Gilbert et al. | May 8, 1951 |

FOREIGN PATENTS

| | | |
|---|---|---|
| 858,185 | France | May 6, 1940 |